(12) United States Patent
Osawa et al.

(10) Patent No.: US 8,590,649 B2
(45) Date of Patent: Nov. 26, 2013

(54) IN-WHEEL MOTOR UNIT

(75) Inventors: Masami Osawa, Nagoya (JP); Yuki Tojima, Chita-gun (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 149 days.

(21) Appl. No.: 13/119,841

(22) PCT Filed: Mar. 23, 2010

(86) PCT No.: PCT/JP2010/054971
§ 371 (c)(1),
(2), (4) Date: Mar. 18, 2011

(87) PCT Pub. No.: WO2010/110258
PCT Pub. Date: Sep. 30, 2010

(65) Prior Publication Data
US 2011/0174560 A1    Jul. 21, 2011

(30) Foreign Application Priority Data
Mar. 25, 2009 (JP) ................................. 2009-073750

(51) Int. Cl.
*B60K 1/00* (2006.01)
(52) U.S. Cl.
USPC ........................... 180/65.51; 180/65.26
(58) Field of Classification Search
USPC .............. 180/65.51, 65.6, 65.1, 65.21, 65.26; 310/75 C, 83
See application file for complete search history.

(56) References Cited

U.S. PATENT DOCUMENTS

| 7,216,731 B2 * | 5/2007 | Kakinami et al. .......... 180/65.51 |
| 7,228,928 B2 * | 6/2007 | Mizutani et al. ........... 180/65.51 |
| 7,243,749 B2 * | 7/2007 | Kakinami et al. ......... 180/65.51 |
| 7,306,065 B2 * | 12/2007 | Nagaya ...................... 180/65.51 |
| 7,347,295 B2 * | 3/2008 | Kurata ........................ 180/65.51 |
| 7,350,605 B2 * | 4/2008 | Mizutani et al. ........... 180/65.51 |
| 7,420,301 B2 * | 9/2008 | Veny et al. .................. 310/75 C |

(Continued)

FOREIGN PATENT DOCUMENTS

| CN | 1100996 | 4/1995 |
| DE | 100 06 460 A1 | 8/2001 |

(Continued)

OTHER PUBLICATIONS

Extended European Search Report dated Aug. 6, 2012, issued by the European Patent Office in corresponding European Application No. 10756054.2. (7 pages).

(Continued)

*Primary Examiner* — Hau Phan
(74) *Attorney, Agent, or Firm* — Buchanan Ingersoll & Rooney PC

(57) ABSTRACT

An in-wheel motor unit is suspended from a vehicle body and outputs torque from an internal motor to a wheel; and has a knuckle, which is suspended from the aforementioned vehicle body; an output shaft, which outputs motor torque to the wheel; a wheel hub, which rotates together with the wheel and is connected to the output shaft such that the output shaft and the wheel hub can rotate together; and a unit casing for the in-wheel motor unit, which houses the motor. The wheel hub is rotatably supported by a first part of the knuckle via a hub bearing, and the unit casing is fixed to a second part of the knuckle via a sleeve.

5 Claims, 4 Drawing Sheets

(56) References Cited

U.S. PATENT DOCUMENTS

| | | | |
|---|---|---|---|
| 7,527,113 B2* | 5/2009 | Jenkins | 180/65.51 |
| 7,641,010 B2* | 1/2010 | Mizutani et al. | 180/65.51 |
| 7,789,178 B2* | 9/2010 | Mizutani et al. | 180/65.51 |
| 7,958,959 B2* | 6/2011 | Yogo et al. | 180/65.51 |
| 8,132,636 B2* | 3/2012 | Suzuki | 180/65.51 |
| 2001/0015300 A1 | 8/2001 | Forster | |
| 2004/0080223 A1* | 4/2004 | Shimizu | 310/75 C |
| 2006/0144626 A1 | 7/2006 | Mizutani et al. | |
| 2008/0017462 A1 | 1/2008 | Mizutani et al. | |
| 2008/0093133 A1 | 4/2008 | Yogo et al. | |
| 2009/0000840 A1 | 1/2009 | Murata | |
| 2009/0101424 A1 | 4/2009 | Suzuki | |

FOREIGN PATENT DOCUMENTS

| | | |
|---|---|---|
| EP | 1 897 740 A2 | 3/2008 |
| EP | 1 932 706 A2 | 6/2008 |
| EP | 1 977 924 A1 | 10/2008 |
| GB | 2 270 055 A | 3/1994 |
| JP | 2005-081871 A | 3/2005 |
| JP | 2007-191019 A | 8/2007 |
| JP | 2007-216928 A | 8/2007 |
| JP | 2008-279850 A | 11/2008 |
| WO | 2007/102545 A1 | 9/2007 |

OTHER PUBLICATIONS

Office Action (Notice of Grounds for Rejection) dated Jul. 10, 2012, issued by the Japanese Patent Office in corresponding Japanese Patent Application No. 2009-073750. (3 pages).

International Preliminary Report on Patentability (Form PCT/IB/373) and the Written Opinion of the International Searching Authority (Form PCT/ISA/237) issued on Oct. 18, 2011, in the corresponding International Application No. PCT/JP2010/054971. (6 pages).

International Search Report (PCT/ISA/210) issued on Jul. 6, 2010, by Japanese Patent Office as the International Searching Authority for International Application No. PCT/JP2010/054971.

Written Opinion (PCT/ISA/237) issued on Jul. 6, 2010, by Japanese Patent Office as the International Searching Authority for International Application No. PCT/JP2010/054971.

Office Action issued on Feb. 16, 2013 by the Chinese Patent Office in corresponding Chinese Patent Application No. 201080002799, and English language translation thereof.

* cited by examiner

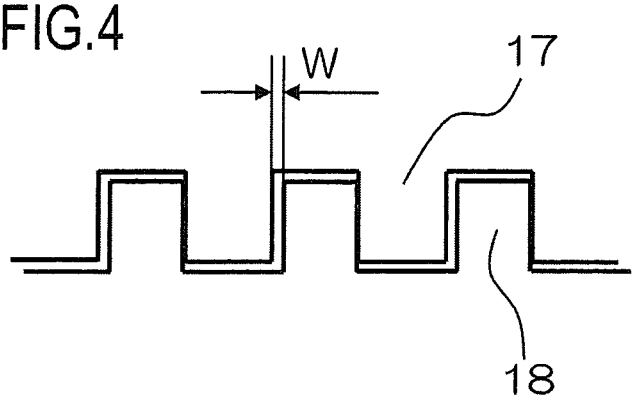

IN-WHEEL MOTOR UNIT

TECHNICAL FIELD

Related Application

This application is based on and claims the benefit of Japanese Patent Application No. 2009-073750, filed Mar. 25, 2009, which is hereby incorporated by reference herein in its entirety. This disclosure relates to an in-wheel motor unit, and particularly this invention relates to a support structure of a wheel hub and a unit casing, in which a motor is provided, of an in-wheel motor unit.

BACKGROUND

Patent Document 1 discloses an in-wheel motor unit having upper and lower arms suspended from a vehicle body, a motor casing movably sandwiched between the upper and lower arms via a ball joint, and an output shaft rotating with a wheel hub by being supported rotatably with the motor casing via a hub bearing.
[Patent Document 1]
Japanese Patent Kokai Publication No. JP-2005-81871 A (paragraphs 0013, 0019 and 0024)

SUMMARY

It should be noted that the contents disclosed in Patent Document 1 is hereby incorporated by reference herein in its entirety. The following analyses are given by the present invention.

According to the in-wheel motor unit of Patent Document 1, a wheel is rotatably supported with a motor casing in the motor casing. Therefore, the whole weight of a vehicle is loaded on the motor casing via the wheel in all the modes of parking, accelerating, normal driving and steering. Thus there is a need to increase rigidity of the hub bearing for supporting the motor casing and the rotatable wheel hub. It causes problems of an increase in a weight of the motor unit and complexity of structures of components of an in-wheel motor unit such as a hub bearing.

It is an object of the present invention to provide an in-wheel motor unit which has a simple structure and can be made lighter.

In a first aspect of this disclosure, there is provided an in-wheel motor unit that is suspended from a vehicle body and outputs torque from an internal motor to a wheel, which comprises a knuckle suspended from the vehicle body, an output shaft that outputs torque of the motor to the wheel, a wheel hub that rotates in unison with the wheel and is connected to the output shaft such that the output shaft and the wheel hub can rotate in unison, and a unit casing for the in-wheel motor unit which houses the motor, in which the wheel hub is rotatably supported by a first part of the knuckle, and the unit casing is fixed to a second part of the knuckle.

BRIEF DESCRIPTION OF THE DRAWINGS

FIG. 4 is a development view of a spline fitting portion between the wheel hub and the output shaft shown in FIG. 3.

PREFERRED MODES

Figure 1:
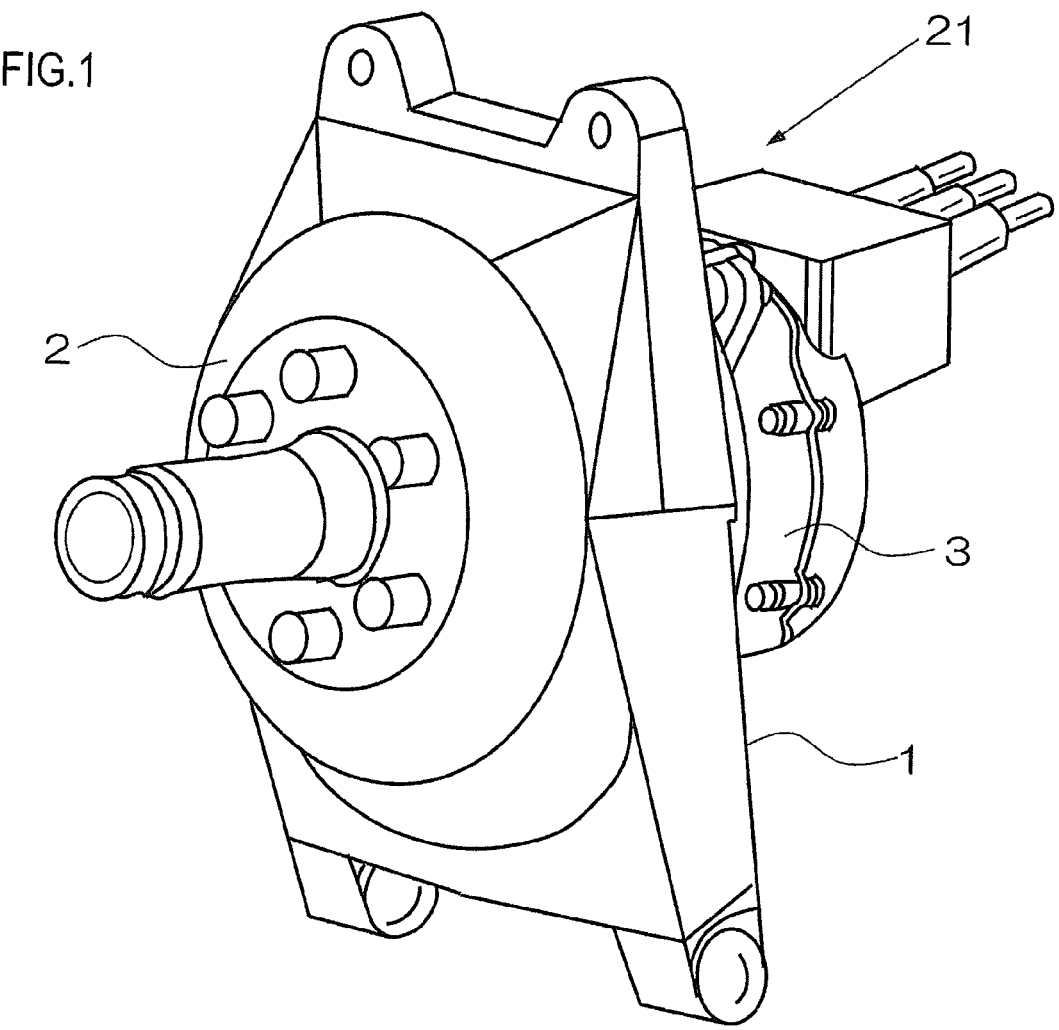
FIG. 1 is a perspective view of an in-wheel motor unit according to an example disclosed here.

A unit casing according to an exemplary embodiment of this disclosure does not receive a load directly from a wheel.

According to an exemplary embodiment of this disclosure, a support structure of an output shaft for power transmitting to a wheel can be simplified. That is because a large load from a vehicle is not transmitted to the output shaft and there is no need for the output shaft to bear any load other than a torque outputted from a motor. For example, an angular ball bearing is conventionally used as a bearing to support an output shaft rotatably to receive a large thrust load transmitted form a vehicle or a wheel. However, according to the present invention, a simply-structured bearing (see shaft bearings 14a and 14b of simple ball bearing type, FIG. 3) for supporting a load only in a rotation direction can be used.

According to an exemplary embodiment of this disclosure, the unit casing is fixed to the second part of the knuckle via a sleeve for positioning. According to the embodiment, a supporting rigidity of a wheel can be made flexible. The reason is as follows. Because a wheel and an in-wheel motor unit are supported separately, when a misalignment of a rotation shaft of the wheel occurs, such a state happens where the in-wheel motor unit bears a load from the wheel. Conventionally, it was believed that it was necessary to increase the supporting rigidity of a wheel to avoid occurrence of such misalignment and resulting adverse influences. However, it becomes possible to avoid the occurrence of such misalignment and its influences, even when the supporting rigidity of a wheel is reduced, by improving an attachment accuracy of an in-wheel motor unit against a knuckle by using a sleeve. In addition, a supporting structure of a wheel hub can be simplified thereby.

According to an exemplary embodiment of this disclosure, the wheel hub is fitted with the output shaft along a rotation direction within a predetermined clearance in the rotation direction. In a case where a radial force is exerted on a wheel by collision with an obstacle or by a steering force, the sudden transmission of a large load to the output shaft from the wheel is absorbed with the aid of the clearance and the load applied on the output shaft can be reduced.

The in-wheel motor unit according to an exemplary embodiment of this disclosure comprises a hub bearing and a shaft bearing. The hub bearing is disposed at a radially outer portion of the unit casing and radially between an internal circumferential face of the knuckle, that is the first part of the knuckle, and an outer circumferential face of the wheel hub, and supports the wheel hub rotatably. The shaft bearing is disposed in the unit casing and radially between an internal circumferential face of the unit casing and an outer circumferential face of the output shaft, and supports the output shaft rotatably. According to this embodiment, the wheel hub is directly supported by the knuckle via the hub bearing and the output shaft is directly supported by the unit casing. It is enough for the unit casing to support a torque only of the motor or a reduction mechanism connected to the motor. Because the hub bearing is disposed at a side of large diameter of the in-wheel motor unit, the support for the wheel hub is stabilized. Preferably, the second part is disposed at an outer circumferential portion of the knuckle and at a side of a larger diameter than the first part. Preferably, a wheel side of the unit casing is inserted in the wheel hub, the motor is housed at a vehicle side in the unit casing, and a flange portion is formed at an axially middle portion of the unit casing such that the flange portion protrudes radially outwardly adapted to be fixed to the second part.

(1) According to this disclosure, a wheel hub is supported by a knuckle, and a unit casing of an in-wheel motor unit does not support the wheel hub. Therefore, the unit casing needs not bare a large load transmitted from a vehicle via a wheel but needs to support only a motor torque. Thus, according to this disclosure, it is possible to make the unit casing lighter or thinner.

(2) According to this disclosure, because the unit casing needs not to support a wheel hub, a structure of the unit casing can be simplified.

(3) According to this disclosure, because only one component, that is a knuckle, can support the unit casing and rotatably support the wheel hub, the in-wheel motor unit can be simply structured and a degree of freedom of a unit casing having an internal motor can be increased.

EXAMPLES

Example 1

Figure 2:
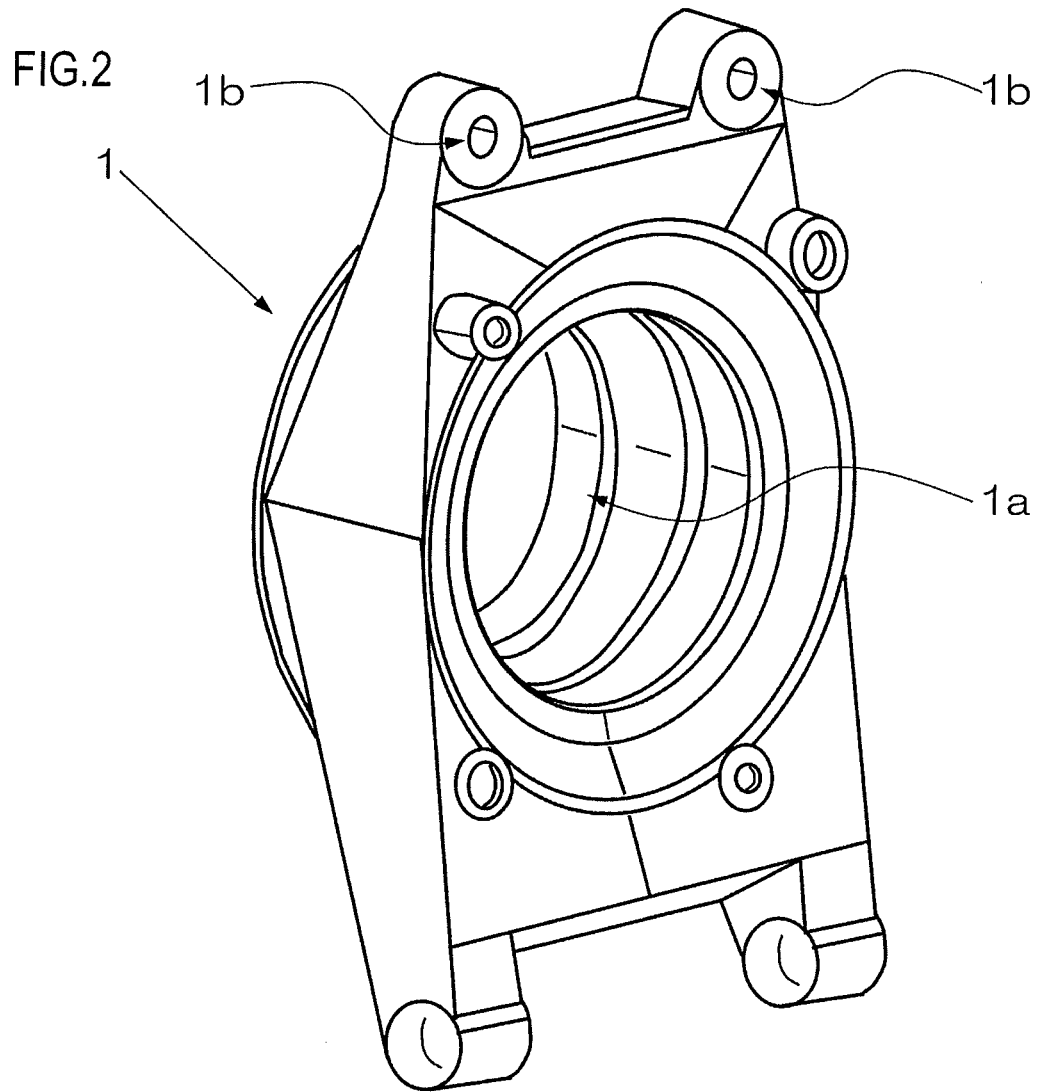
FIG. 2 is a perspective view from backside of the knuckle shown in FIG. 1.

An example of this disclosure will be explained with reference to the drawings. FIG. 1 is a perspective view of an in-wheel motor unit according to an example of the present invention and FIG. 2 is a perspective view from backside of the knuckle shown in FIG. 1. Referring to FIGS. 1 and 2, a wheel hub 2 is attached to one side of a knuckle 1 having a cylindrical portion and a unit casing 3 of the in-wheel motor unit 21 is attached to the other side of the knuckle 1.

Figure 3:
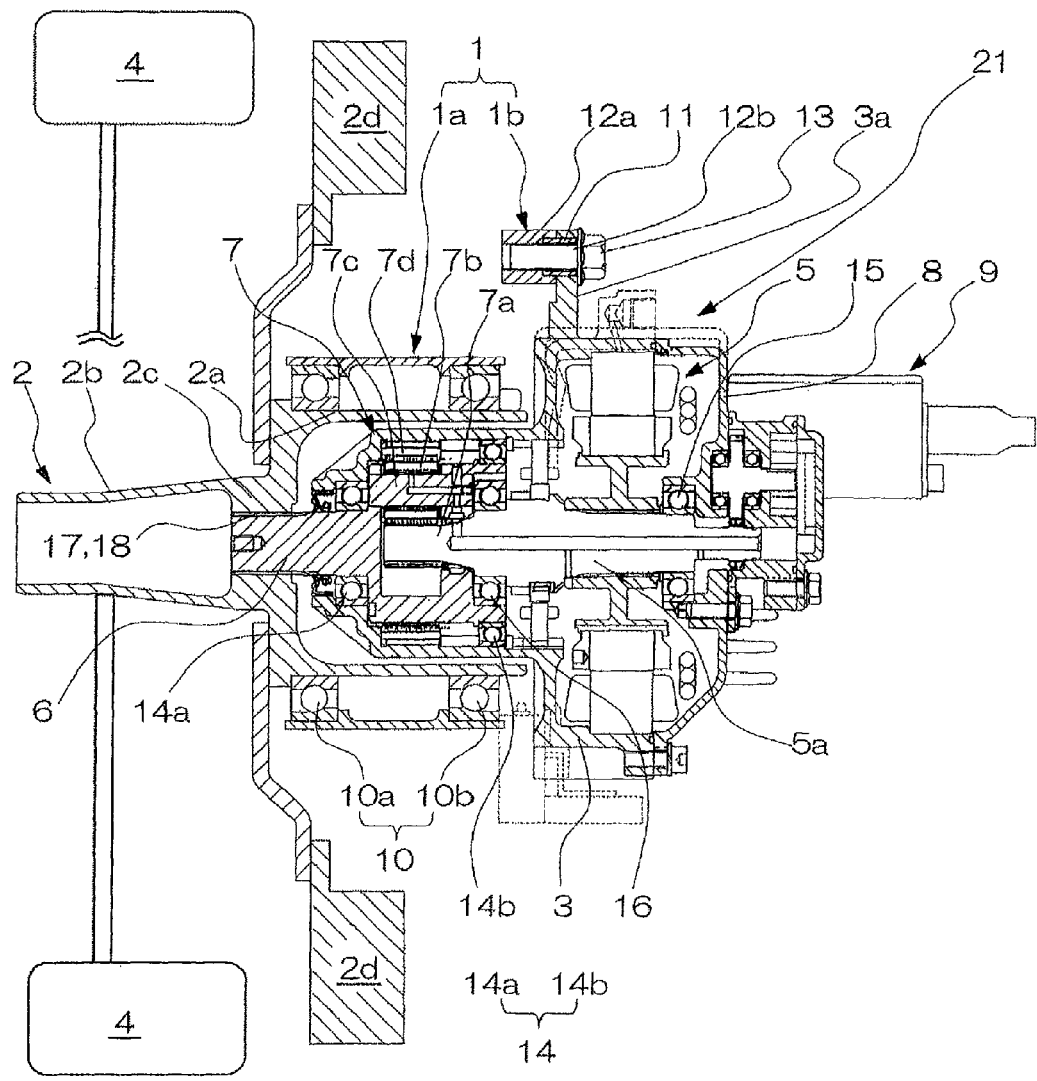
FIG. 3 is a sectional view of an in-wheel motor unit according to an example disclosed here.

FIG. 3 is a sectional view of the in-wheel motor unit according to an example of this disclosure. Referring to FIG. 3, the in-wheel motor unit 21 is suspended from a vehicle (not shown in the drawing) and outputs rotatory power of an internal motor 5 to a wheel 4. The in-wheel motor unit 21 comprises the knuckle 1 suspended from a vehicle body via a pair of arms and a joint, for example, an output shaft 6 outputting a torque of the motor 5 to the wheel 4, the wheel hub 2 rotating together with the wheel 4 and connected to the output shaft 6 such that the wheel hub 2 can rotate together with the output shaft 6, and the unit casing 3 in which the motor 5 is housed.

The in-wheel motor unit 21 further comprises a reduction mechanism (gear train) 7 connected between the motor 5 and the output shaft 6. The unit casing 3 stores the motor 5 and the reduction mechanism 7. The output shaft 6 protrudes from one side face of the unit casing 3. A unit cover 8 is provided at one side face of the unit casing 3 and the unit cover 8 supports an oil pump unit 9.

A large-diameter cylindrical portion 2a of the wheel hub 2 provided at a vehicle body side is inserted between an internal circumferential face of the knuckle 1 and an outer circumferential face of the unit casing 3. The wheel 4 is attached to a small-diameter cylindrical portion 2b provided at a wheel side of the wheel hub 2 such that the wheel 4 rotates together with the wheel hub 2. A caliper 2d attached to an axially middle portion 2c of the wheel hub 2 is slidable relative to a brake (not shown). FIG. 3 illustrates a center support structure in which the wheel 4 is attached to the center of the wheel hub 2; however, the wheel 4 can be attached to the wheel hub 2 by a plurality of flange bolts arranged radially.

A first part 1a of the knuckle 1 is an internal circumferential face of the knuckle 1 and a second part 1b is disposed at an outer circumferential portion at a side of a larger diameter portion than the first part 1a. A hub bearing 10 that rotatably supports the wheel hub 2 is disposed at a radially outer portion of the unit casing 3 between an internal circumferential face of the knuckle 1, which is the first part 1a, and an outer circumferential face of the wheel hub 2. The hub bearing 10 is composed of a first hub bearing portion 10a and a second hub bearing portion 10b disposed at a predetermined axial interval. The hub bearing 10 is disposed at a side of a large diameter portion of the in-wheel motor unit 21 and supports the wheel hub 2 stably and also receives a thrust load exerted on the wheel hub 2.

A side of the unit casing 3 directed toward the wheel 4 is inserted in the wheel hub 2, the motor 5 is disposed at a vehicle side of the unit casing 3, and a flange portion 3a is formed at an axially middle portion of the unit casing 3 such that the flange portion protrudes toward a radially outer direction adapted to be fixed to the second part 1b. The flange portion 3a protruding toward a radially outer direction is formed at an axially middle portion of the unit casing 3. The flange portion 3a is fixed to the second part 1b arranged on a vehicle body side of the knuckle 1 via a sleeve 11 for positioning. Specifically, two bolt holes 12a are formed at the second part 1b arranged at an upper portion of the knuckle 1. Also two bolt holes 12b are formed at an upper portion of the flange portion 3a. A bolt 13 is screwed into the bolt hole 12a in a state that the sleeve 11 is inserted into each of the bolt holes 12a and 12b. By such a manner, the unit casing 3 can be fixed to the knuckle 1 while the attaching position of the unit casing 3 is finely adjusted. The attaching accuracy of the in-wheel motor unit 21 can be thus improved. A stepped sleeve and the like can be used for the sleeve 11.

Within the unit casing 3, a shaft bearing 14 that rotatably supports the output shaft 6 is disposed radially between an internal circumferential face of the unit casing 3 and an outer circumferential face of the output shaft 6. The shaft bearing 14 comprises a first shaft bearing 14a that supports the output shaft 6 directly and rotatably and a second shaft bearing 14b that supports the output shaft 6 indirectly and rotatably.

The first shaft bearing 14a is disposed at a wheel 4 side along the axial direction and radially between an outer circumferential face of the output shaft 6 and an internal circumferential face of the unit casing 3 at a wheel 4 side, in the unit casing 3. The second shaft bearing 14b is disposed at a vehicle side along the axial direction and radially between an outer circumferential face of the carrier 7c (output shaft 6) and an internal circumferential face of the unit casing 3 at a vehicle side, in the unit casing 3.

The motor 5 is housed in a cylindrical portion at a vehicle side of the unit casing and outputs rotatory power from a rotation shaft 5a to the reduction mechanism 7. The rotation shaft 5a can supply driving power to an oil pump unit 9 for supplying lubricant oil to portions of the in-wheel motor unit 21 where lubrication is necessary. The rotation shaft 5a is rotatably supported by a first rotation shaft bearing 15 disposed radially between an outer circumferential face at a vehicle side of the rotation shaft 5a and an internal circumferential face of the unit cover 8 and a second rotation shaft bearing 16 disposed between an outer circumferential face at a wheel side of the rotation shaft 5a and an internal circumferential face at a vehicle side of the carrier 7.

The reduction mechanism 7 is a planetary-gear-type reducer and comprises a sun gear 7a that rotates together with the rotation shaft 5a of the motor 5, a plurality of pinions 7b that engage with the sun gear 7a, the carrier 7c that axially supports the plurality of pinions 7b, and a ring gear 7d that is disposed in the unit casing 3 and engages with the plurality of pinions 7b.

An outer spline 17 is formed on an outer circumferential face at a wheel side of the output shaft 6 that is an output shaft of the reduction mechanism 7. An internal spline 18 is formed on an internal circumferential face at a middle portion of the wheel hub 2.

FIG. 4 is a developed view of a spline fitting portion between the wheel hub 2 and the output shaft 6 shown in FIG. 3. Particularly, referring to FIG. 4, the outer spline 17 and the internal spline 18 are spline-fitted with a predetermined clearance W along a circumferential direction. That is, the wheel hub 2 is fitted with the output shaft 6 along the rotational direction with a predetermined clearance W in the rotational direction.

A function of the in-wheel motor unit 21 according to the Example will be explained. A torque of the motor 5 is inputted in the sun gear 7a of the reduction mechanism 7 and outputted from the output shaft 6 with a reduced speed via the plurality of pinions 7b and the carrier 7c. The wheel 4 is driven to rotate via the wheel hub 2 that is integrally connected with the output shaft 6 in the rotational direction.

On the other hand, when a load is inputted to the in-wheel motor unit 21 from the wheel 4 side, a sudden transmission of the large load to the in-wheel motor unit 21 via the output shaft 6 can be restricted because of the clearance W provided in the spline fitting between the wheel hub 2 and the output shaft 6 as shown in FIG. 4. In addition, a load transmitted to the unit casing 3 becomes small because the wheel hub 2 is rotatably supported by the knuckle 1.

According to the in-wheel motor unit 21 of the Example, the wheel hub 2 is supported by the knuckle 1 and the unit casing 3 of the in-wheel motor unit 21 does not support the wheel hub 2. The unit casing 3 needs not to receive the large load transmitted from the vehicle via the wheel 4 and needs to support only a torque of the motor 5. Thus, the unit casing 3 can be made lighter or thinner and is simplified.

INDUSTRIAL APPLICABILITY

The present invention can be applied to a vehicle having an in-wheel motor.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned.

EXPLANATIONS OF SYMBOLS 1 knuckle
1a first part
1b second part
2 wheel hub
2a large-diameter cylindrical portion
2b small-diameter cylindrical portion
2c axial middle portion
2d caliper
3 unit casing
3a flange portion
4 wheel
5 motor
5a rotation shaft
6 output shaft
7 reduction mechanism
7a sun gear
7b a plurality of pinions
7c carrier
7d ring gear
8 unit cover
9 oil pump unit
10 hub bearing
10a, 10b first, second hub bearing
11 sleeve
12a, 12b bolt hole
13 bolt
14 shaft bearing
14a, 14b first, second shaft bearing
15 first rotation shaft bearing
16 second rotation shaft bearing
17 outer spline
18 internal spline
21 in-wheel motor unit
W clearance

The invention claimed is:

1. An in-wheel motor unit that is suspended from a vehicle body and outputs torque from an internal motor to a wheel, comprising:
a knuckle suspended from the vehicle body;
an output shaft that outputs torque of said motor to the wheel;
a wheel hub that rotates in unison with the wheel and is connected to the output shaft such that the output shaft and the wheel hub can rotate in unison; and
a unit casing for the in-wheel motor unit which houses the motor; wherein
the wheel hub is rotatably supported by a first part of the knuckle,
the unit casing is fixed to a second part of the knuckle by a bolt passing through a hole in the unit casing and a hole in the second part of the knuckle, and
the first part of the knuckle possesses an inner circumferential surface surrounding a tubular cylindrical cavity, and a portion of the wheel hub is positioned within the tubular cylindrical cavity of the first part of the knuckle.

2. An in-wheel motor unit suspended from a vehicle body and configured to output torque from an internal motor to a wheel, the in-wheel motor unit comprising:
a knuckle suspended from the vehicle body, the knuckle possessing a first portion and a second portion;
an output shaft rotatable by the internal motor, the output shaft possessing an outer circumferential surface including an outer spline;
a wheel hub rotatably supported by the first portion of the knuckle, the wheel hub being rotatable together with the output shaft and the wheel, the wheel hub possessing an inner circumferential surface including an inner spline that meshingly engages with the outer spline of the output shaft so that the wheel hub rotates together with the output shaft; and
a casing housing the internal motor and fixed to the second portion of the knuckle.

3. The in-wheel motor unit of claim 2, wherein a portion of the inner spline is spaced apart from the outer spline in a circumferential direction of the output shaft.

4. An in-wheel motor unit suspended from a vehicle body and configured to output torque from an internal motor to a wheel, the in-wheel motor unit comprising:
a knuckle suspended from the vehicle body and possessing an inner circumferential surface surrounding a tubular cylindrical cavity;
an output shaft rotatable by the internal motor;
a wheel hub rotatable together with the wheel and the output shaft, a portion of the wheel hub being positioned within the tubular cylindrical cavity of the knuckle and rotatably supported by the inner circumferential surface of the knuckle; and a casing housing the internal motor and fixed to the knuckle.

5. The in-wheel motor unit of claim 4, further comprising a bearing positioned between the wheel hub and the inner circumferential surface of the knuckle.

* * * * *